United States Patent [19]

Frank

[11] Patent Number: 5,348,207
[45] Date of Patent: Sep. 20, 1994

[54] VEHICLE TOP CARRIER

[76] Inventor: Sylvester H. Frank, 407 Hilltop Ave., Kalispell, Mont. 59901

[21] Appl. No.: 71,063

[22] Filed: Jun. 4, 1993

[51] Int. Cl.$^5$ .............................................. B60R 9/00
[52] U.S. Cl. .................... 224/310; 224/317; 224/319; 224/328; 224/309; 312/310; 312/323
[58] Field of Search ............. 224/309, 310, 328, 917, 224/329, 330, 331, 319, 324, 317; 312/310, 322, 323, 133

[56] References Cited

U.S. PATENT DOCUMENTS

| | | | |
|---|---|---|---|
| 2,812,992 | 11/1957 | Lysen | 224/328 |
| 3,113,819 | 12/1963 | Bessette | 224/328 |
| 3,580,439 | 5/1971 | Jewett | 224/328 |
| 3,715,044 | 2/1973 | Simons | 224/328 |

FOREIGN PATENT DOCUMENTS

| | | | |
|---|---|---|---|
| 3326789 | 2/1984 | Fed. Rep. of Germany | 224/329 |
| 0171636 | 8/1986 | Japan | 224/917 |

*Primary Examiner*—Linda J. Sholl
*Attorney, Agent, or Firm*—S. Michael Bender

[57] ABSTRACT

A new and improved carrier apparatus for mounting on the roof of a vehicle. The apparatus of the invention includes a housing, magnetic mounts for connecting the housing to the vehicle and for supporting the housing in a horizontal orientation, and a drawer for sliding in and out of the housing. A pivoted connection is provided for connecting the drawer to the housing. The pivoted connection is located between the far end of the drawer and the housing and pivots the far end of the drawer with respect to the housing when the drawer is pulled out from the housing. The pivoted connection permits the drawer to hang down vertically from the horizontally oriented housing when the drawer is pulled out completely from the housing. The drawer includes walls which define a storage space. Partitions are located within the storage space for partitioning the storage space into a plurality of storage subspaces. When the drawer is retained in the horizontally oriented housing, the drawer is in the horizontal storage mode. When the drawer is pulled out from the housing and hangs down from the housing by the pivoted connection, the drawer is in the vertical access mode. The partitions prevent horizontal mingling of stored items in the horizontal storage mode and prevent vertical and horizontal mingling of stored items in the vertical access mode. In addition, the mounts can also include a fluid suspension which may include a liquid or air as a suspension fluid.

2 Claims, 5 Drawing Sheets

VEHICLE TOP CARRIER

BACKGROUND OF THE INVENTION

1. Field of the Invention

The present invention relates generally to carriers mounted in vehicles, and more particularly, to a carrier mounted on the roof of a vehicle.

2. Description of the Prior Art

Carriers that are placed on vehicle roofs are well known in the art. Such carriers are often used for carrying luggage or other large, bulky items. The following United States patents all disclose carriers, mounted on vehicle roofs, for carrying large, bulky items: U.S. Pat. Nos. 3,696,979 of Erickson; 3,901,422 of Anderson et al; 4,058,243 of Tappan; 4,354,625 of Peoples; and 4,940,175 of Tittel.

However, aside from carrying large bulky items, it may also be desirable to carry a number of relatively small items in a carrier mounted on a vehicle roof. In this respect, if a number of different kinds of small items are to be carried in the roof-mounted carrier, it would be desirable to carry the small items in a way that allowed the small items to be retained in organized groups.

Because a roof is so high off of the ground, it is usually very inconvenient to load and unload items into and out of a roof-mounted carrier while the carrier is mounted on the roof. Most often, the carrier must be removed from the roof for loading and unloading of the carrier. Otherwise, it would be necessary to climb up onto the vehicle hood or trunk lid to access the contents of the carrier. In this respect, it would be desirable if a roof-mounted carrier were provided that permitted loading and unloading thereof without removing the carrier from the roof. Also, it would be desirable if a roof-mounted carrier were provided that permitted accessing the contents of the carrier without having a person climb onto the vehicle.

Also, in this respect, it would be desirable if a roof-mounted carrier were provided that permitted the carrier to carry a number of small items in an organized way and permitted the organized small items to be easily accessed without removing the carrier from the vehicle and without climbing onto the vehicle.

Thus, while the foregoing body of prior art indicates it to be well known to use a carrier mounted on a vehicle roof for carrying large, bulky items, the provision of a simple and cost effective device for carrying a number of small items in an organized manner, in a roof-mounted vehicle carrier is not contemplated. Also, the prior art does not provide a roof-mounted carrier that permits loading and unloading thereof without removing the carrier from the roof. Or, alternatively, the prior art does not provide accessing the contents of the roof-mounted carrier without having a person climb onto the vehicle. The prior art does not provide a carrier for carrying a number of small items in an organized way that permits the organized small items to be easily accessed without removing the carrier from the vehicle or without climbing onto the roof of the vehicle. The foregoing disadvantages are overcome by the unique drawer-containing vehicle top carrier apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved carrier apparatus for mounting on a vehicle. The apparatus of the invention is comprised of a housing, mounting means for connecting the housing to the vehicle and for supporting the housing in a horizontal orientation, and a drawer for sliding in and out of the housing. A pivoted connection is provided for connecting the far end of the drawer to the housing. The pivoted connection is located between the far end of the drawer and the housing and pivots the drawer with respect to the housing when the drawer is pulled out completely from the housing. The pivoted connection permits the drawer to hang down vertically from the horizontally oriented housing.

The drawer includes walls which define a storage space. Partitions are located within the storage space for partitioning the storage space into a plurality of storage subspaces.

When the drawer is retained in the horizontally oriented housing, the drawer is in the horizontal storage mode. When the drawer is pulled completely out from the housing and hangs down from the housing by the pivoted connection at the far end of the drawer, the drawer is in the vertical access mode. The partitions prevent horizontal mingling of stored items in the horizontal storage mode and prevent vertical and horizontal mingling of stored items in the vertical access mode.

Preferably, the housing is connected to an elevated, planar support on the vehicle, and the preferred elevated, planar support is the vehicle roof. Preferably, the mounts for connecting the housing to the vehicle and for supporting the housing in a horizontal orientation include magnets or suction cups. In addition, the mounts can also include a fluid suspension which may include a liquid or air as a suspension fluid.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least three preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved drawer-containing vehicle top carrier apparatus which has all of the advantages of the prior art and none of the disadvantages.

It is another object of the present invention to provide a new and improved drawer-containing vehicle top carrier apparatus which may be easily and efficiently manufactured and marketed.

It is a further object of the present invention to provide a new and improved drawer-containing vehicle top carrier apparatus which is of durable and reliable construction.

An even further object of the present invention is to provide a new and improved drawer-containing vehicle top carrier apparatus which is susceptible of a low cost of manufacture with regard to both materials and labor, and which accordingly is then susceptible of low prices of sale to the consuming public, thereby making such drawer-containing vehicle top carrier apparatus available to the buying public.

Still yet a further object of the present invention is to provide a new and improved drawer-containing vehicle top carrier apparatus to carry a number of relatively small items in a carrier mounted on a vehicle roof.

Still another object of the present invention is to provide a new and improved drawer-containing vehicle top carrier apparatus to carry the small items in a roof-mounted carrier in a way that allows the small items to be retained in organized groups.

Yet another object of the present invention is to provide a new and improved drawer-containing vehicle top carrier apparatus which permits loading and unloading thereof without removing the carrier from the roof.

Even another object of the present invention is to provide a new and improved drawer-containing vehicle top carrier apparatus that permits accessing the contents of the carrier without having a person climb onto the vehicle.

Still a further object of the present invention is to provide a new and improved drawer-containing vehicle top carrier apparatus that permits the carrier to carry a number of small items in an organized way and permits the organized small items to be easily accessed without removing the carrier from the vehicle and without having a person climb onto the vehicle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved drawer-containing vehicle top carrier apparatus embodying the principles and concepts of the present invention will be described.

Turning initially to FIGS. 1-7, there is shown a first exemplary embodiment of the drawer-containing vehicle top carrier apparatus of the invention generally designated by reference numeral 10. The drawer-containing vehicle top carrier apparatus 10 of the invention is mounted on the roof 11 of a vehicle 12. The apparatus 10 includes a housing 14 and means for both connecting the housing 14 to the vehicle 12 and for supporting the housing 14 in a horizontal orientation.

Figures 1, 1B, 2:
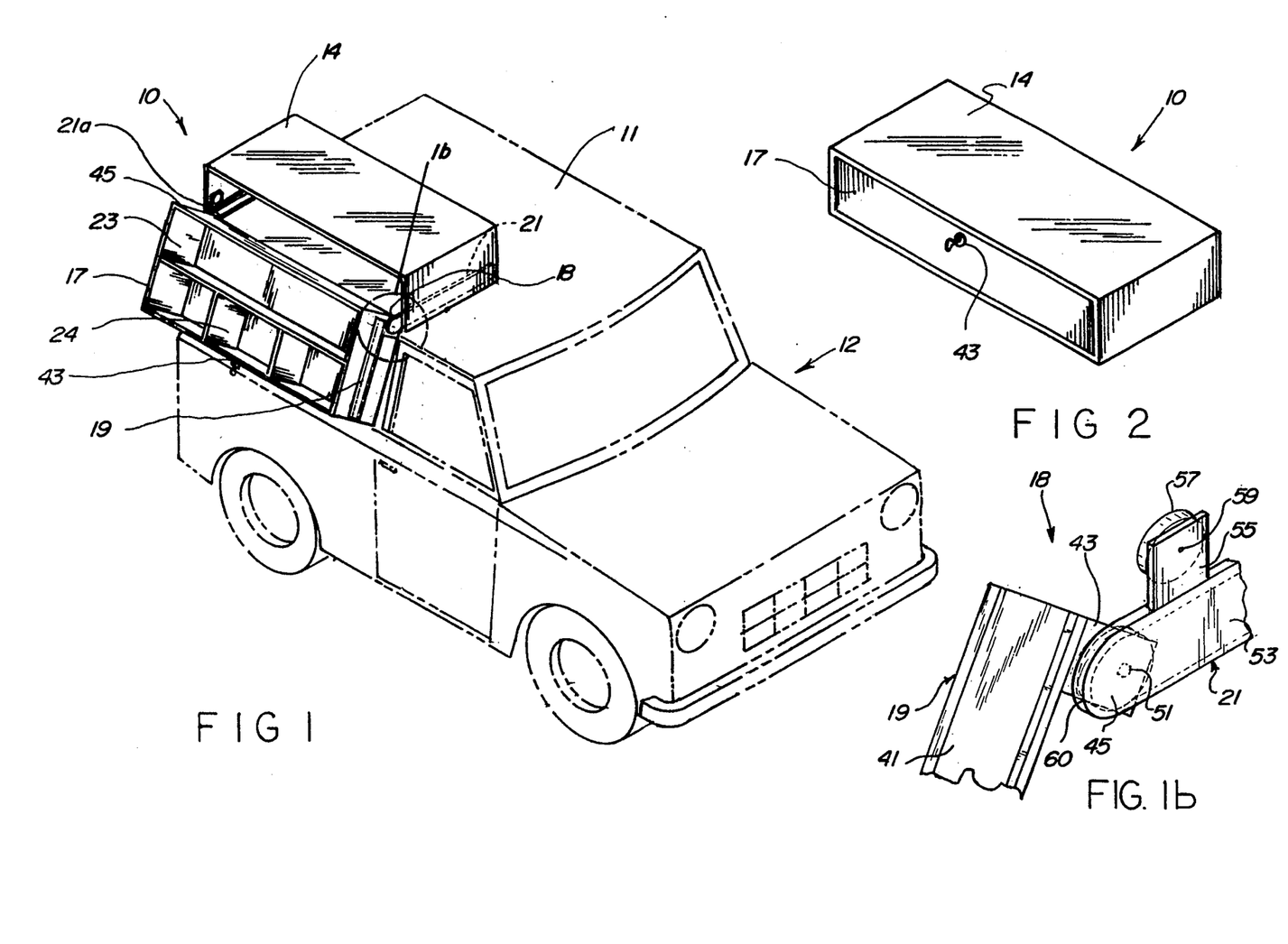
FIG. 1 is a perspective view showing a first preferred embodiment of the drawer-containing vehicle top carrier apparatus of the invention installed on the roof of a vehicle and in an open, vertical access mode.
FIG. 1b is a perspective view showing in enlarged detail a portion of the pivotal connection assembly between the drawer and the housing of the carrier top apparatus of the invention.
FIG. 2 is a perspective view of the drawer-containing vehicle top carrier apparatus of the invention shown in FIG. 1 removed from the vehicle and in a closed, horizontal storage mode.
Figure 3:
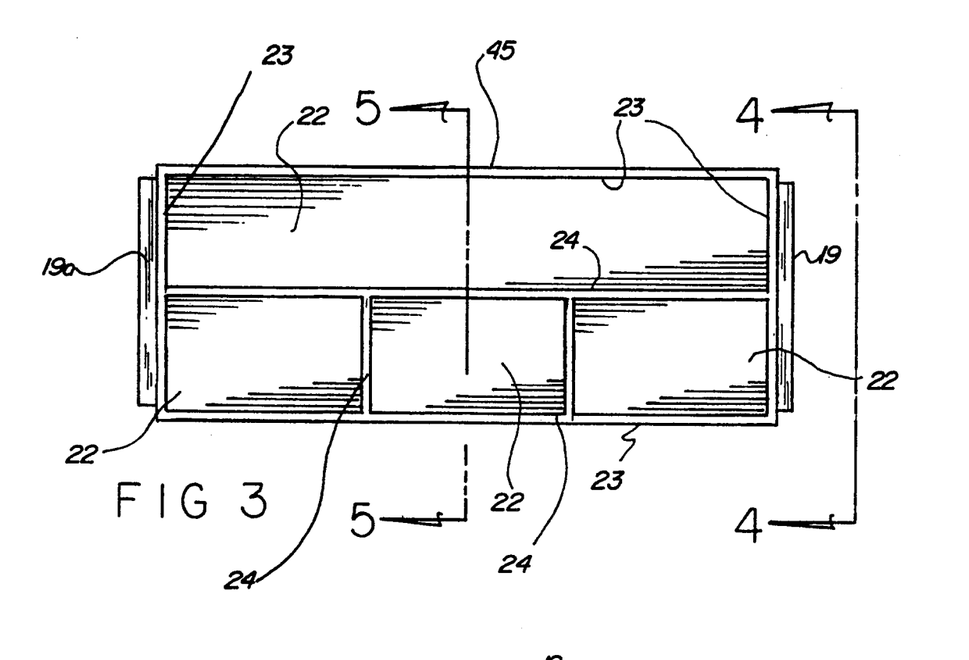
FIG. 3 is a top planar view of the drawer of the invention looking horizontally onto the hanging drawer in the vertical access mode shown in FIG. 1.
Figure 4:
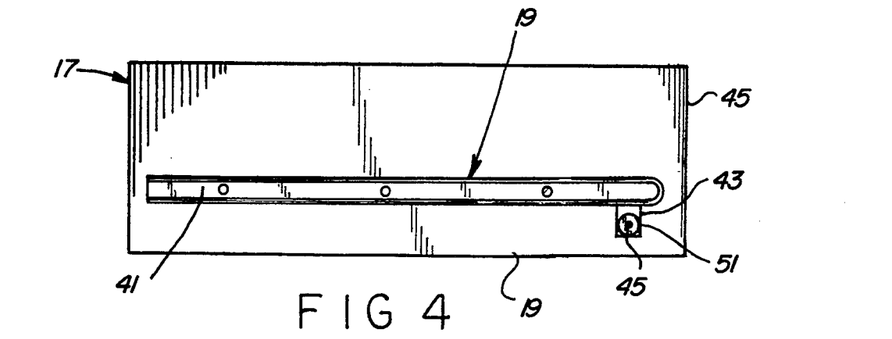
FIG. 4 is a side view the drawer shown in FIG. 3 taken along the line 4—4 thereof.
Figure 5:
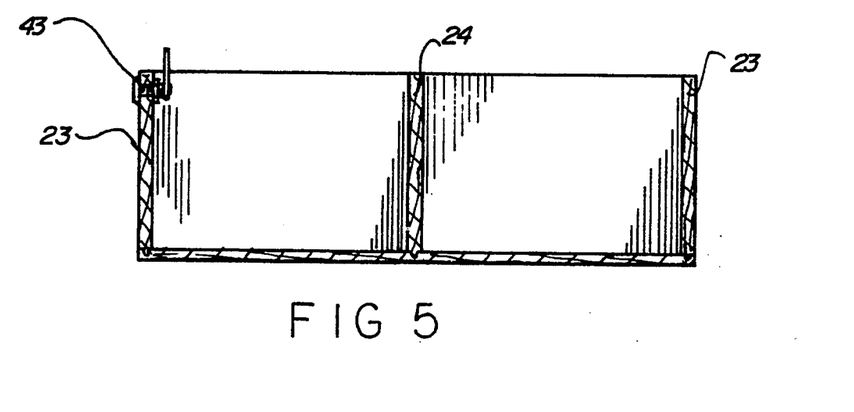
FIG. 5 is a cross-sectional view of the drawer shown in FIG. 3 taken along the line 5—5 thereof.

A drawer 17 is installed in the housing 14 for sliding in and out of the housing 14. As shown in FIG. 1, the drawer 17 is hanging onto the housing 14 at the far end 45 of drawer 17 in a vertical access mode. As shown in FIG. 2, the drawer 17 has been slid into the housing 14 in a horizontal storage mode. A key-operated lock 43 is provided to secure the drawer 17 to the housing 14 when the drawer 17 is closed. The drawer 17 includes walls 23 which define a storage space inside the housing. The drawer 17 also includes partitions 24, located within the storage space, for partitioning the storage space into a plurality of storage subspaces 22. Means are provided at the far end 45 of the drawer 17 for connecting the drawer 17 to the housing 14.

More specifically, the means for mounting the housing 14 onto the roof 11 include magnetic mounting assemblies 15. Also, more specifically, the means for connecting the drawer 17 to the housing 14 include a pivot assembly 18, located at the far end 45 of the drawer 17 between the drawer 17 and the housing 14, for pivoting the drawer 17 with respect to the housing 14 when the drawer 17 is pulled out from the housing 14. The pivot assembly 18 permits the drawer 17 to hang down vertically from the horizontally oriented housing 14.

More specifically, the pivot assembly 18 includes a pair of tracks or rails 19, 19a located on the drawer 17 and a pair of cooperating tracks or rails 21, 21a located on the housing 14. One of each track 19, 19a is located on a respective sidewall of the drawer 17, whereas one of each cooperating track or rail 21, 21a is located on a respective confronting sidewall of the housing 14 interiorly thereof.

As shown most specifically in FIGS. 1 and 6, 6a, 6b and 6c, when the drawer 17 hangs by its far end 45 from the housing 14, the tracks 19, 19a having stop means located at their ends, enable the drawer to hang in accordance with the invention in a tilted fashion from the ends of rails 21, 21a which latter are affixed on the housing 14. Even more specifically, tracks 19, 19a are each in the form of an elongated channel 41, open at their opposed ends, and having a downwardly directed tab 43 at the rear end thereof which, in turn, rotatably supports a first roller 45 via a suitable axle 51. Cooperating tracks 21, 21a each also comprises an elongated channel 53 having an upwardly directed tab 55 at its front end, respectively, which tab 55 rotatably supports a second roller 57 via a suitable axle 59. However, it will be noted, each channel 53 is closed at both ends, respectively, by arcuate rail sections 60 and 62. The tracks 19, 19a are fixedly secured respectively to the opposed sidewalls of drawer 17 by means of suitable fasteners extending through suitable spaced holes in each channel 41 (see FIG. 4). Each track 21, 21a, on the other hand, is slidably affixed respectively to the inside surface of the sidewalls of housing 14 by means of a pair of spaced, elongated slots 63, 65 and bolts 67, 69 extending orthogonally through the slots into each corresponding housing sidewall. As a result of this arrangement, tracks 21, 21a can slide longitudinally relative to the housing's sidewalls through a range determined by the length or elongated (longitudinal) dimension of each slot 63, 65 with the bolts engaging the lateral boundaries of the slots to limit movement of each rail relative to the housing and define the aforementioned predetermined range.

Figures 6, 6A, 6B, 6C:
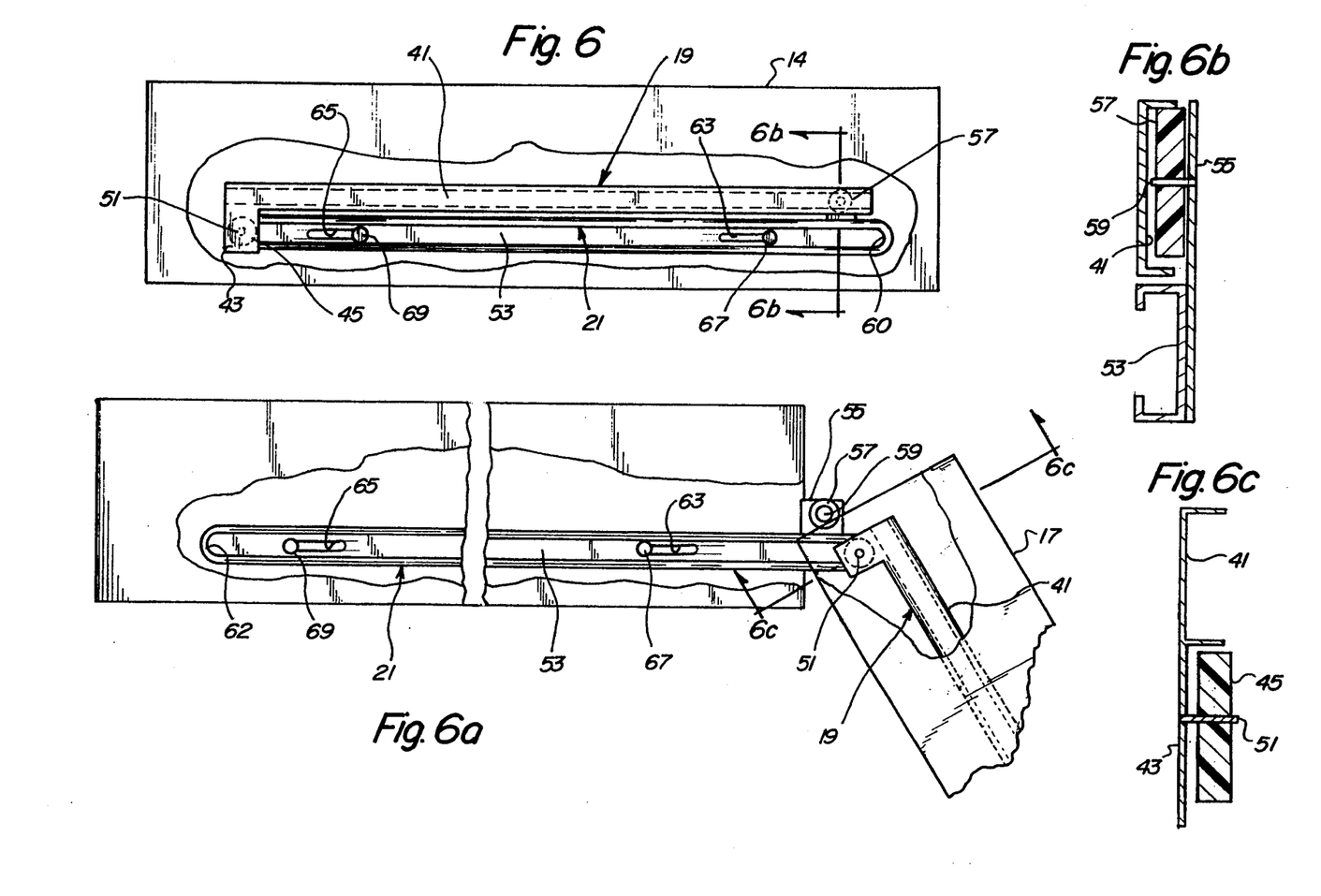
FIG. 6 is a side view of the drawer-containing vehicle top carrier apparatus of the invention partially broken away to reveal the cooperating slide rails pivotally connecting the drawer to the housing thereof.
FIG. 6a is a side view of the drawer-containing vehicle top carrier apparatus of the invention partially broken away to reveal the cooperating slide rails pivotally connecting the drawer to the housing thereof and showing the drawer in its fully withdrawn tilted position.
FIG. 6b is a cross-sectional view of a pair of the cooperating sliding rails of the invention taken along line 6b—6b of FIG. 6.
FIG. 6c is a cross-sectional view of the channel comprising one the rails of FIG. 6b, namely, the channel of the rail fixedly secured to the drawer and shown when the drawer in its fully withdrawn tilted position.

In the closed position, i.e. when drawer 17 is fully retracted inside housing 14 in the horizontal position (FIG. 6), first roller 45 engages channel 53 and more specifically the closed arcuate section 62 thereof causing the channel 53 to retract by slidable movement relative to bolts 67, 69. In addition, second roller 57 engages channel 41 as substantially shown in FIG. 6. As drawer 17 is withdrawn from housing 14, the aforementioned roller and rail engagement maintains the drawer and the housing horizontal until first roller 45 approaches and then engages the front closed arcuate section 60 of channels 53 causing each channel to slide out through the mouth of the housing (FIG. 6a). This action permits channel 41 to disengage from second roller 57 and provides sufficient clearance for the top edge of drawer 17 to clear the roof of the housing and tilt downwardly about the axis defined by the first roller's axle 51 (see FIGS. 1b and 6a). In the tilted or vertical position, the drawer may be rested against the side of a vehicle to provide easy and quick access to the storage compartments (subspaces 22) defined by the drawer's partitions and to the contents stored therein. To close the drawer, all that is necessary is to tilt the drawer upwardly to the horizontal position and push it back longitudinally to the fully retracted position of FIG. 6. When this action is carried out, the channel 41 engages second roller 57, and first roller 45 traverses lower channel 53 until it engages closed arcuate section 62 thereby causing the second channel 53 to slide rearwardly into the housing.

To briefly recapitulate, FIGS. 1 and 6a show the drawer 17 in the access mode with the drawer hanging tilted from the overhang of withdrawn channels 53. Conversely, when the drawer 17 is moved into the closed, horizontal storage mode, the channels 53 are slid back into the housing 14 along with the drawer 17 to keep out water, dust, and the like.

Figure 7:
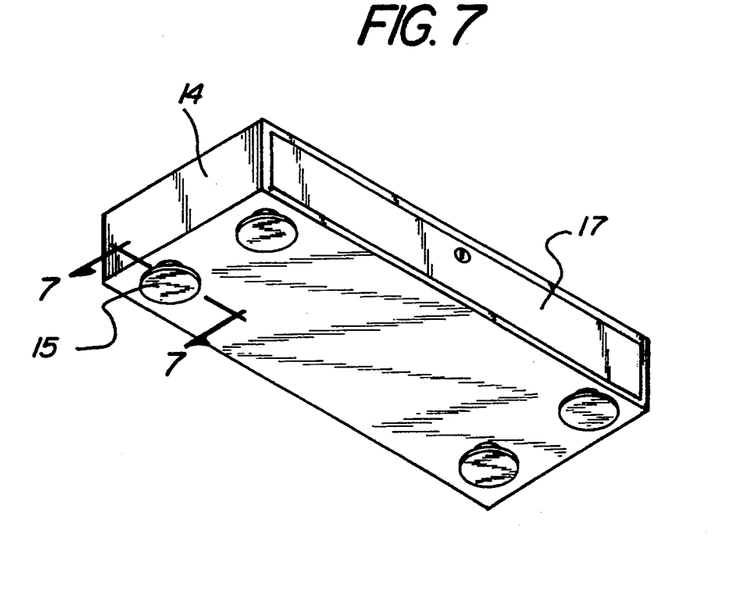
FIG. 7 is a bottom perspective view of the embodiment of the drawer-containing vehicle top carrier apparatus of the invention shown in FIG. 2 showing magnetic mounts for mounting the invention onto an iron-containing roof of a vehicle.

As stated above, when the drawer 17 is retained in the horizontally oriented housing 14 (as shown in FIGS. 2, 6, and 7), the drawer 17 is in a horizontal storage mode. And, when the drawer 17 is pulled out from the housing 14 and hangs down from the housing 14 (as shown in FIGS. 1 and 6a), the drawer 17 is in the vertical or tilted access mode. The partitions 24 prevent horizontal mingling of stored items (not shown) in the horizontal storage mode and prevent vertical and horizontal mingling of the stored items in the vertical access mode.

Figure 8:
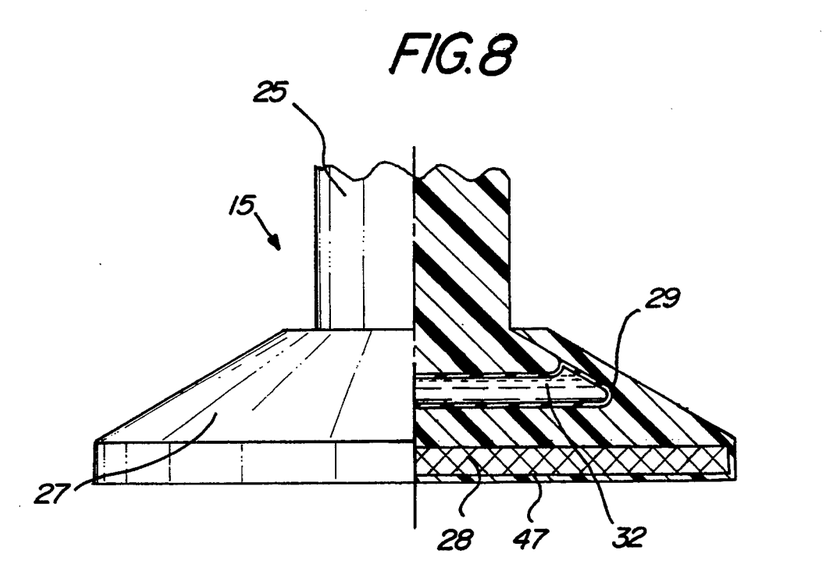
FIG. 8 is a partial cross-sectional view of a second embodiment of means for connecting the housing of the drawer-containing vehicle top carrier apparatus of the invention to a vehicle roof.

Turning to FIG. 8, a second embodiment of a mounting assembly 15 of the drawer-containing vehicle top carrier apparatus 10 of the invention is shown. More specifically, the mounting assembly 15 includes a shaft 25, which is connected to the housing 14, and a foot 27, which is connected to the roof of the vehicle. The foot 27 includes a magnet 28 and a fluid-containing cell 29 that includes a quantity of a liquid 32. A plastic coating 47 is juxtaposed between the magnet 28 and the roof 11 of the vehicle 12 to prevent paint on the vehicle 12 from scratching. The liquid 32 serves as a suspension fluid and shock absorber, serving analogous functions to liquid-containing shock absorbers used in conjunction with vehicle wheel assemblies.

Figure 9:
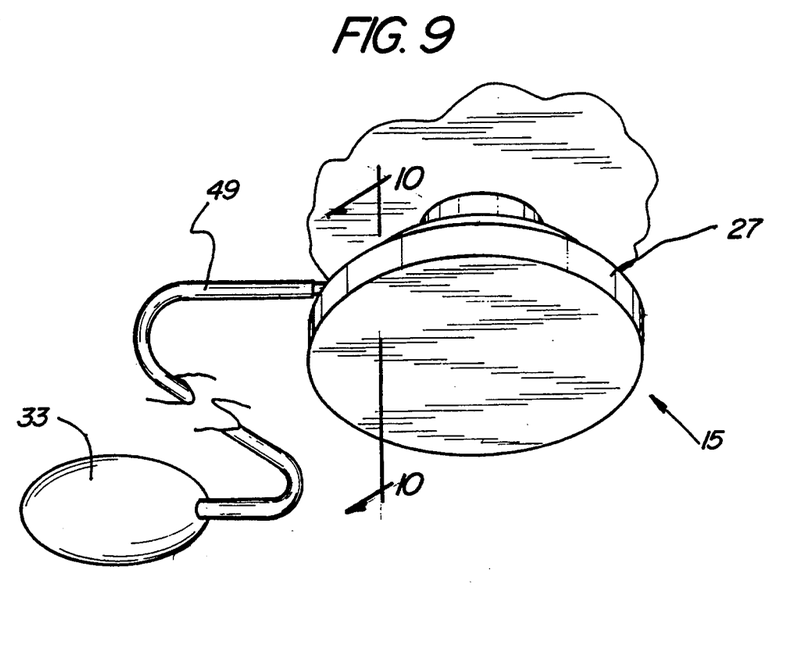
FIG. 9 is a perspective view of a third embodiment of means for connecting the housing of the drawer-containing vehicle top carrier apparatus of the invention to a vehicle roof.
Figure 10:
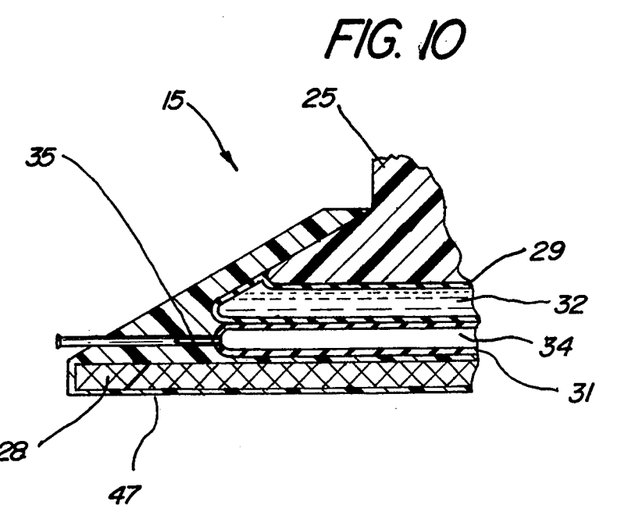
FIG. 10 is a partial cross-sectional view of the third embodiment of the means for connecting the housing of the drawer-containing vehicle top carrier apparatus of the invention to a vehicle roof shown in FIG. 8, taken along the line 10—10 thereof.

Turning to FIGS. 9 and 10, a third embodiment of a mounting assembly 15 of the drawer-containing vehicle top carrier apparatus 10 of the invention is shown. Reference numerals are shown that correspond to like reference numerals that designate like elements shown in the other figures. In addition, the mounting assembly 15 includes a second fluid-containing cell 31 which is selectively pumped up with air 34 using squeeze bulb 33 through tube 49. A one-way valve 35 permits air pumped into second fluid-containing cell 31 to be retained in the cell 31 under pressure. The one-way valve 35 is provided with a pressure release to relieve the second fluid-containing cell 31 from unwanted pressure. The pressurized air 34 serves as an additional suspension fluid and shock absorber, serving analogous functions to air-pumped shock absorbers used in conjunction with vehicle wheel assemblies. The selectable pressure air-pumped cell 31 is especially useful in accommodating different weight loads retained in the drawer 17.

As shown in FIG. 1, the housing 14 is connected to an elevated, planar support which is the roof 11 of the vehicle 12. Alternatively, the drawer-containing vehicle top carrier apparatus 10 of the invention could be connected to a fender, across fence stakes of a pickup truck, or other suitable parts of a vehicle provided that the housing is retained in a horizontal orientation.

The housing 14 and the drawer 17 can be made from a variety of inexpensive materials which include plastic, wood, and metal. A number of alternative suitable means can be used for connecting the housing 14 to the vehicle 12. For example, suction cups can be employed, or metal clips or straps can be used to connect the drawer-containing vehicle top carrier apparatus of the invention to a luggage rack that has been previously installed on a vehicle roof.

A number of alternate mechanisms can be used for connecting the drawer 17 to the housing 14 in addition to the track 19 and wheel 21 shown in FIG. 6. For example, the drawer sliding mechanisms used in filing cabinets can also be adapted to the drawer-containing vehicle top carrier apparatus 10 of the present invention. Moreover, a self-closing drawer track can be employed which employs a sloped track installed in the drawer, whereby, gravity causes the drawer to close as the sloped track rides down a roller installed on the housing.

In addition, instead of using cooperating rails 19, 19a and 21, 21a, to hang the drawer 17 from the housing 14, one end of a short length of retractable cable, rope, or chain can be installed on each respective side of the far end 45 of the drawer 17. The other ends of the respective cables or ropes can be attached to the housing 14. Then, the pivoting of the drawer 17 with respect to the housing 14, and the hanging of the drawer 17 from the housing 14 can be carried out by the respective flexible tethers (cables, ropes, chains, etc.).

It is apparent from the above that the present invention accomplishes all of the objects set forth by providing a new and improved drawer-containing vehicle top carrier apparatus that is low in cost, relatively simple in design and operation, and which may advantageously be used for conveniently storing and accessing a number of items stored in the apparatus.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A carrier apparatus for mounting on the roof of a vehicle, said apparatus comprising:
    a housing;
    means for connecting said housing to said roof of said vehicle and for supporting said housing in a horizontal orientation;
    drawer means for sliding in and out of the interior space defined by said housing; and
    means for connecting said drawer means to said housing,
        said connecting means further including pivoting means, located within said interior space between said drawer means and said housing, for pivoting said drawer means with respect to said housing when said drawer means is pulled out from said housing, said pivoting means permitting said drawer means to hang down vertically from said horizontally oriented housing and rest against the side of said vehicle,
        wherein said pivoting means comprises a first channel rail fixed to said drawer means, and a second channel rail slidably fixed to said housing within said interior space adjacent to said first channel rail, said first channel rail having first roller means connected to the end of said first channel rail extending furthest into said interior space when said drawer means is contained in said housing, said first roller means being engaged with the channel defined by said second channel rail, and
        wherein said second channel rail having second roller means connected to the end of said second channel rail proximal to the opening through which said drawer means extends into said housing interior space, said second roller means being engaged with the channel defined by said first channel rail, said second channel rail having stop means at said proximal end adapted to engage said first roller means sliding in said channel defined by said second channel rail when said drawer means is withdrawn form said housing interior space to thereby cause said second channel rail to slidably displace out from said housing through said opening and permit said first channel rail to disengage form said second roller means and said drawer means to pivot about a pivot axis defined by said first roller means.

2. The apparatus described in claim 1 wherein:
    said drawer means includes walls which define a storage space;
    said drawer means includes partition means located within said storage space for partitioning said storage space into a plurality of storage subspaces;

said drawer means, being retained in said horizontally oriented housing, defines a horizontal storage mode;

said drawer means, being pulled out from said housing and having down from said housing, defines a vertical access mode; and said partition means prevent horizontal mingling of stored items in the horizontal storage mode and prevent vertical and horizontal mingling of stored items in the vertical access mode.

* * * * *